US010935071B2

(12) United States Patent
Yokoe (10) Patent No.: US 10,935,071 B2
(45) Date of Patent: Mar. 2, 2021

(54) MOTOR AND VALVE DRIVE DEVICE (71) Applicant: NIDEC SANKYO CORPORATION, Nagano (JP)

(72) Inventor: Satoru Yokoe, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/425,170

(22) Filed: May 29, 2019

(65) Prior Publication Data
US 2019/0368539 A1 Dec. 5, 2019

(30) Foreign Application Priority Data

May 31, 2018 (JP) .............................. JP2018-105043

(51) Int. Cl.
*F16C 17/26* (2006.01)
*F16C 33/10* (2006.01)
(Continued)

(52) U.S. Cl.
CPC .............. *F16C 17/26* (2013.01); *F16C 27/02* (2013.01); *F16C 27/063* (2013.01); *F16C 33/10* (2013.01); *F16C 33/20* (2013.01); *F16K 31/54* (2013.01); *H02K 5/1672* (2013.01); *F16C 2361/61* (2013.01)

(58) Field of Classification Search
CPC ........ F16C 17/26; F16C 25/04; F16C 25/063; F16C 27/063; F16C 29/002; F16C 33/10; F16C 33/20; F16C 2208/66; F16C 2380/66; F16C 2361/61; F16C 27/02; H02K 5/1672; H02K 5/24; H02K 1/30; F16K 3/08; F16K 31/041; F16K 31/54
USPC ........... 384/100, 114, 129–130, 125; 310/90; 137/15.21, 315.17; 251/129.11, 339, 248, 251/286
See application file for complete search history.

(56) References Cited

U.S. PATENT DOCUMENTS 3,333,513 A * 8/1967 Fritz ................... F15B 15/1433
92/165 R
3,431,033 A * 3/1969 Dangauthier ........... F16C 27/02
384/125
(Continued)

FOREIGN PATENT DOCUMENTS

CN 101911439 A 12/2010
FR 2364721 A1 * 4/1978 ........... B23B 29/034
(Continued)

*Primary Examiner* — Marcus Charles
(74) *Attorney, Agent, or Firm* — Cantor Colburn LLP (57) ABSTRACT

There is provided a motor including a rotor having a magnet fixed to the outer periphery of a rotor main body, a spindle for rotatably supporting the rotor via the rotor main body, a first bearing unit provided at one end side of the rotor in a longitudinal direction of the spindle, and a second bearing unit provided at the other end side of the rotor in the longitudinal direction of the spindle. The first bearing unit slidably contacts the spindle with a set clearance, and the second bearing unit includes an elastic bearing unit slidably contacting the spindle in a state of being elastically pressed against the spindle. When the first bearing unit is defined as a bearing unit at the one end side in the longitudinal direction of the spindle, the elastic bearing unit is configured to be located as a bearing unit at the other end side.

13 Claims, 11 Drawing Sheets

(51) Int. Cl.
*F16C 33/20* (2006.01)
*F16C 27/02* (2006.01)
*H02K 5/16* (2006.01)
*F16K 31/54* (2006.01)
*H02K 5/167* (2006.01)
*F16C 27/06* (2006.01)

(56) References Cited

U.S. PATENT DOCUMENTS

| | | | | |
|---|---|---|---|---|
| 4,324,438 | A * | 4/1982 | Lister | E21B 33/085 384/16 |
| 6,769,445 | B2 * | 8/2004 | Hashimoto | F16K 31/04 137/15.21 |
| 6,880,802 | B2 * | 4/2005 | Hara | F16K 3/08 137/315.17 |
| 6,926,250 | B1 * | 8/2005 | Hashimoto | F16K 11/074 251/129.11 |
| 7,220,056 | B2 * | 5/2007 | Kubota | B62D 1/16 384/215 |
| 7,523,917 | B2 * | 4/2009 | Arai | F16K 31/04 251/129.11 |
| 7,793,915 | B2 * | 9/2010 | Ozawa | F16K 11/074 251/211 |
| 8,436,503 | B2 * | 5/2013 | Fujiwara | F16C 25/04 310/90 |
| 9,279,450 | B2 * | 3/2016 | Zaike | B62D 3/12 |
| 9,903,479 | B2 * | 2/2018 | Yokoe | F16K 31/535 |
| 2010/0295398 | A1 | 11/2010 | Fujiwara et al. | |
| 2012/0037828 | A1 * | 2/2012 | Reeb | F16K 3/085 251/321 |
| 2015/0276070 | A1 | 10/2015 | Yokoe et al. | |

FOREIGN PATENT DOCUMENTS

| | | | | |
|---|---|---|---|---|
| JP | 54-155530 | * | 10/1979 | F16C 17/00 |
| JP | 2002195694 | A | 7/2002 | |
| JP | 2003324890 | A * | 11/2003 | H02K 5/04 |
| JP | 2008151289 | A * | 7/2008 | F16C 25/04 |
| KR | 1020100106447 | A | 11/2010 | |
| KR | 1020150088234 | A | 10/2015 | |
| KR | 1020120015524 | A | 4/2017 | |
| WO | 2009093443 | A1 | 7/2009 | |

* cited by examiner

MOTOR AND VALVE DRIVE DEVICE

CROSS-REFERENCE TO RELATED APPLICATION

The present application claims priority under 35 U.S.C. § 119 to Japanese Patent Application No. 2018-105043, filed on May 31, 2018, the entire contents of which are incorporated herein by reference.

FIELD OF THE INVENTION

At least an embodiment of the present invention relates to a motor, and more particularly, a motor including a bearing for rotatably supporting a rotor on a spindle (fixed shaft), and also to a valve drive device including such a motor.

BACKGROUND

Examples of this type of motor include the motor described in WO2009/093443. In this motor, a rotor 20 is rotatably supported on a spindle 12 by bearing units at three locations, that is, a first bearing unit 301 provided at one end of the rotor 20, a third bearing unit 35 provided at the other end of the rotor 20, and a second bearing unit 302 provided between the first bearing unit 301 and the third bearing unit 35. The second bearing unit 302 includes an urging unit and is rotatably supported on the spindle 12 by the urging unit. Furthermore, a lubricant filled space S filled with a lubricant is formed between the first bearing unit 301 and the third bearing unit 35, and the second bearing unit 302 is disposed in the lubricant filled space S.

In the conventional motor, by the bearing units at three locations, that is, the first bearing unit 301, the third bearing unit 35, and the second bearing 302 that is provided between the first bearing unit 301 and the third bearing unit 35 and that includes the urging unit, the rotor 20 is rotatably supported on the spindle 12. Further, the lubricant filled space S filled with a lubricant is formed between the first bearing unit 301 and the third bearing unit 35. With this structure, it is supposed that a noise generated due to variation in a clearance between the bearing units 301, 35 and the spindle 12 can be reduced.

However, the bearing units are present at the three locations and the second bearing unit 302 including the urging unit is disposed within the lubricant filled space S, and thus, there is a problem that the bearing structure is complicated and it is not easy to manufacture the bearing structure.

An object of at least an embodiment of the present invention is to provide a motor capable of reducing a noise generated due to variation in a clearance between bearing units and a spindle with a simple structure.

SUMMARY

According to one aspect of the present disclosure, there is provided a motor comprising a rotor having a magnet fixed to an outer periphery of a rotor main body, a spindle configured to rotatably support the rotor via the rotor main body, a first bearing unit provided at one end side of the rotor in a longitudinal direction of the spindle and configured to slidably contact the spindle, and a second bearing unit provided at the other end side of the rotor in the longitudinal direction of the spindle and configured to slidably contact the spindle, wherein the first bearing unit slidably contacts the spindle with a set clearance, the second bearing unit includes an elastic bearing unit configured to slidably contact the spindle in a state of being elastically pressed against the spindle, and when the first bearing unit is defined as a bearing unit at one end of the spindle in the longitudinal direction of the spindle, the elastic bearing unit is located as a bearing unit at the other end thereof.

Here, in "when the first bearing unit is defined as a bearing unit at one end of the spindle in the longitudinal direction of the spindle, the elastic bearing unit is located as a bearing unit at the other end thereof", the elastic bearing unit being "located as a bearing unit at the other end thereof" means that another bearing unit having a similar configuration to the first bearing unit is not provided outside the elastic bearing unit, that is, at the opposite side of the first bearing unit.

According to this aspect, the second bearing unit includes the elastic bearing unit slidably contacting the spindle in a state of being elastically pressed against the spindle. When the first bearing unit is defined as a bearing unit at one end of the spindle in the longitudinal direction of the spindle, the elastic bearing unit is located as a bearing unit at the other end thereof.

In other words, one end side of the rotor is supported on the spindle by the first bearing unit having the set clearance, and the other end side of the rotor is supported by the elastic bearing unit.

Thus, by a simple bearing structure where out of the bearing units at the both ends of the rotor, the bearing unit at one end is the elastic bearing unit, variation in a clearance between the bearing unit and the spindle can be absorbed by elastic deformation of the elastic bearing unit, and in addition, noise generated due to vibration when the rotor is rotated can be reduced.

In the motor according to at least an embodiment of the present invention, the elastic bearing unit includes a plurality of elastic arm units extending from a main body of the second bearing unit in a direction that is the longitudinal direction of the spindle and in a direction away from the first bearing unit, and the plurality of elastic arm units each include, at a distal end side thereof, a contact unit configured to slidably contact the spindle.

According to this aspect, the elastic bearing unit includes a contact unit configured of a plurality of elastic arm units extending in a direction away from the first bearing unit, and configured to slidably contact the spindle at a distal end side of the elastic arm units. With this structure of the elastic arm units, the structure is simplified, and as a result, the elastic bearing unit capable of obtaining the effect can be easily manufactured.

In the motor according to at least an embodiment of the present invention, when the spindle is inserted inside an area surrounded by the plurality of elastic arm units, the plurality of elastic arm units are bent and deformed along an outer diameter of the spindle and pressed against the spindle by a reaction of the bending deformation.

According to this aspect, when the spindle is inserted inside an area surrounded by the plurality of elastic arm units, the elastic arm unit is bent and deformed along an outer diameter of the spindle and pressed against the spindle by the reaction of the bending deformation. Therefore, the assembly to the spindle can be easily performed.

In the motor according to at least an embodiment of the present invention, the plurality of elastic arm units are positioned at equal intervals in a circumferential direction of the spindle.

According to this aspect, an equal urging force of the elastic arm units can be easily realized.

In the motor according to at least an embodiment of the present invention, the second bearing unit includes an enclosure unit configured to surround the plurality of elastic arm units, and an arm distal end position of each of the elastic arm units is lower than a height of the enclosure unit when the direction in which the plurality of elastic arm units are formed to extend is defined as a height direction.

According to this aspect, the arm distal end position of each of the elastic arm units is lower than a height of the enclosure unit when the extending direction is defined as the height direction. This enclosure unit can reduce a risk of inadvertent damage of the elastic arm units.

In the motor according to at least an embodiment of the present invention, the second bearing unit includes, at the distal end side of the plurality of elastic arm units, a receiving unit configured to receive an urging force of an elastic member toward the one end side.

According to this aspect, the second bearing unit includes the receiving unit configured to receive the urging force toward the one end side of the elastic member, at the arm distal end side. Therefore, the elastic member can be easily installed, and movement of the rotor along the spindle can be reliably suppressed.

In the motor according to at least an embodiment of the present invention, the elastic bearing unit is in surface contact with the spindle.

According to this aspect, since the elastic bearing unit is in surface contact with the spindle, the rotation of the rotor can be stabilized.

In the motor according to at least an embodiment of the present invention, the second bearing unit is formed separately from the rotor main body, and is configured to be engaged with the rotor main body to rotate integrally therewith.

Here, "being engaged" is used to imply a structure capable of realizing an integral rotation between the second bearing unit and the rotor main body, and may mean integration toward the rotation direction by engagement with a convex unit and a concave unit, integration toward the rotation direction by a snap fit, integration toward the rotation direction by a press fit structure, and the like.

According to this aspect, the second bearing unit is formed separately from the rotor main body, and is configured to be engaged with the rotor main body to rotate integrally therewith. As a result, a material having a characteristic appropriate for use as the elastic bearing unit can be selected individually from a material of the rotor main body, and a degree of freedom to select an appropriate material is improved.

In the motor according to at least an embodiment of the present invention, the rotor main body is provided with a plurality of convex units configured to hold the second bearing unit to be engaged with the rotor main body.

According to this aspect, the rotor main body is provided with the plurality of convex units configured to hold the second bearing unit, and thus, the second bearing unit engaged can be firmly held.

In the motor according to at least an embodiment of the present invention, an outer peripheral surface of a main body of the second bearing unit is configured to contact the plurality of convex units to position the second bearing unit relative to the rotor main body.

According to this aspect, when the outer peripheral surface of the main body of the second bearing unit contacts the plurality of convex units, the position of the second bearing unit relative to the rotor main body is determined. That is, in this configuration, the second bearing unit is positioned and fixed relative to the rotor main body by the contact with the convex unit. Thus, the second bearing unit being a separate body can be easily assembled to the rotor main body.

In the motor according to at least an embodiment of the present invention, the second bearing unit is formed by integral molding with the rotor main body and is configured to rotate integrally therewith.

According to this aspect, since the second bearing unit is formed by integral molding with the rotor main body, an increase of the number of components can be suppressed.

In the motor according to at least an embodiment of the present invention, a relief not contacting the spindle is formed in a portion of the rotor main body facing the spindle, the portion being a region between the first bearing unit and the second bearing unit.

According to this aspect, when the relief is provided, an effect of absorbing variation in a clearance between the bearing unit and the spindle by the elastic deformation of the elastic bearing unit, and an effect of reducing the noise generated due to the vibration during the rotation of the rotor can be more effectively obtained.

In the motor according to at least an embodiment of the present invention, one end of the spindle at a side of the first bearing unit is fixed non-rotatably to a base of the motor, and the other end thereof at a side of the second bearing unit is not fixed in a rotation direction.

According to this aspect, it is possible to obtain an effective effect by applying such a cantilever type spindle to the motor.

A valve drive device according to at least an embodiment of the present invention is a valve drive device including a base including a fluid inlet, a fluid outlet, and a valve seat surface, at least one of the fluid inlet and the fluid outlet being opened at the valve seat surface; a cover configured to define, between the valve seat surface and the cover, a valve chamber with which the fluid inlet and the fluid outlet communicate; a valve element rotatably arranged in the valve chamber, having a contact surface sliding on the valve seat surface, and configured to rotate to switch a flow path of the fluid; and a valve element drive mechanism configured to rotate the valve element about an axis orthogonal to the valve seat surface, wherein the valve element drive mechanism rotates the valve element by using, as a power source, the motor described in the above aspects.

According to this aspect, in the valve drive device including the valve element drive mechanism configured to adjust a flow rate of fluid, the effect of each of the aspects can be obtained when the valve element is rotated by using the motor according to any one of the aspects as a power source of the valve element drive mechanism.

In the valve drive device according to at least an embodiment of the present invention, one end of the spindle of the motor at a side of the first bearing unit is non-rotatably fixed to the base, the other end thereof at a side of the second bearing unit is not fixed in a rotation direction, a pinion is arranged between the base and the rotor main body on a side of the one end of the spindle, the pinion is attached at the side of the first bearing unit of the rotor main body so as to rotate integrally with the rotor, and the valve element is configured to rotate via a reduction gear meshing with the pinion.

According to this aspect, the valve element is configured to rotate via the reduction gear meshing with the pinion. As a result, it is possible to decelerate and transmit the rotation of the motor by the reduction gear. Further, compared to a direct-acting motor without the reduction mechanism, a magnet size and a motor size can be reduced, and an increase in output torque can be expected.

In the valve drive device according to at least an embodiment of the present invention, an elastic member configured to apply, to the rotor, an urging force in a direction toward the base is arranged at a side of the other end of the spindle in a state where the urging force acts on the second bearing unit.

According to this aspect, an elastic member configured to apply, to the rotor, an urging force in a direction toward the base is arranged at the other end side of the spindle in a state where the urging force acts on the second bearing unit. As a result, movement along the spindle of the rotor can be reliably suppressed.

According to at least an embodiment of the present invention, it is possible to provide a motor capable of reducing noise generated due to variation in a clearance between a bearing unit and a spindle with a simple structure, and to provide a valve drive device including the motor.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DETAILED DESCRIPTION

A motor and a valve drive device according to at least an embodiment of the present invention will be described in detail with reference to embodiments illustrated in FIG. 1 to FIG. 11 based on these drawings, below.

It is noted that in the following description, first, a brief configuration of the motor of the present embodiment and a brief configuration of the valve drive device of the present embodiment including the motor will be described based on FIG. 1 to FIG. 4.

Next, based on FIG. 3 to FIG. 5, a specific configuration, an operation, and an effect of the motor of the present embodiment will be described.

Next, a specific configuration of the valve drive device according to the present embodiment will be described based on FIG. 1 to FIG. 4 and FIG. 6 to FIG. 9. Subsequently, an operation mode of the valve drive device of the present embodiment will be described based on FIG. 10 and FIG. 11 focusing on a relationship between a rotation angle (number of steps) of a valve element and an opening/closing operation of the valve element. Thereafter, an operation and effect of the valve drive device of the present embodiment will be described.

Finally, another embodiment of the present invention will be briefly described, which partially differs in configuration from the present embodiment configured as described above.

(1) Brief Configuration of Motor (see FIG. 1 to FIG. 4)

A motor 1 according to at least an embodiment of the present invention includes a rotor 7 having a magnet 3 fixed to an outer periphery of a rotor main body 5, a spindle 9 configured to rotatably support the rotor 7 via the rotor main body 5, a first bearing unit 11 provided at one end A side in a longitudinal direction Z of the spindle 9 of the rotor 7 and slidably contacting the spindle 9, and a second bearing unit 13 provided at the other end B side in the longitudinal direction Z of the spindle 9 of the rotor 7 and slidably contacting the spindle 9. Then, the first bearing unit 11 slidably contacts the spindle 9 in a state of having a set clearance, and the second bearing unit 13 includes the elastic bearing unit 15 slidably contacting the spindle 9 in a state of being elastically pressed against the spindle 9.

Further, when the first bearing unit 11 is defined as a bearing unit at one end A side in the longitudinal direction Z of the spindle 9, the elastic bearing unit 15 is located as a bearing unit at the other end B side.

Further, in the spindle 9 to which the rotor 7 is attached via the first bearing unit 11 and the second bearing unit 13, the one end A of the spindle 9 is fixed non-rotatably (in a fixed state) to the disc-shaped base 2, as an example, of the motor 1. On the other hand, the other end B of the spindle 9 is attached unfixedly to a rotation direction R while being fitted into a concave unit 4a formed on a top board of a cover 4 raised upward, in FIG. 3 and FIG. 4, from a peripheral edge of the base 2.

In addition, a stator 17 including a stator core 18 and a coil 19 is arranged on an outer periphery of the rotor 7 with the cover 4 interposed therebetween. A housing 21 configured to cover a part of a top surface and an outer peripheral surface of the stator 17 is provided outside the stator 17 as an example.

Figure 3:
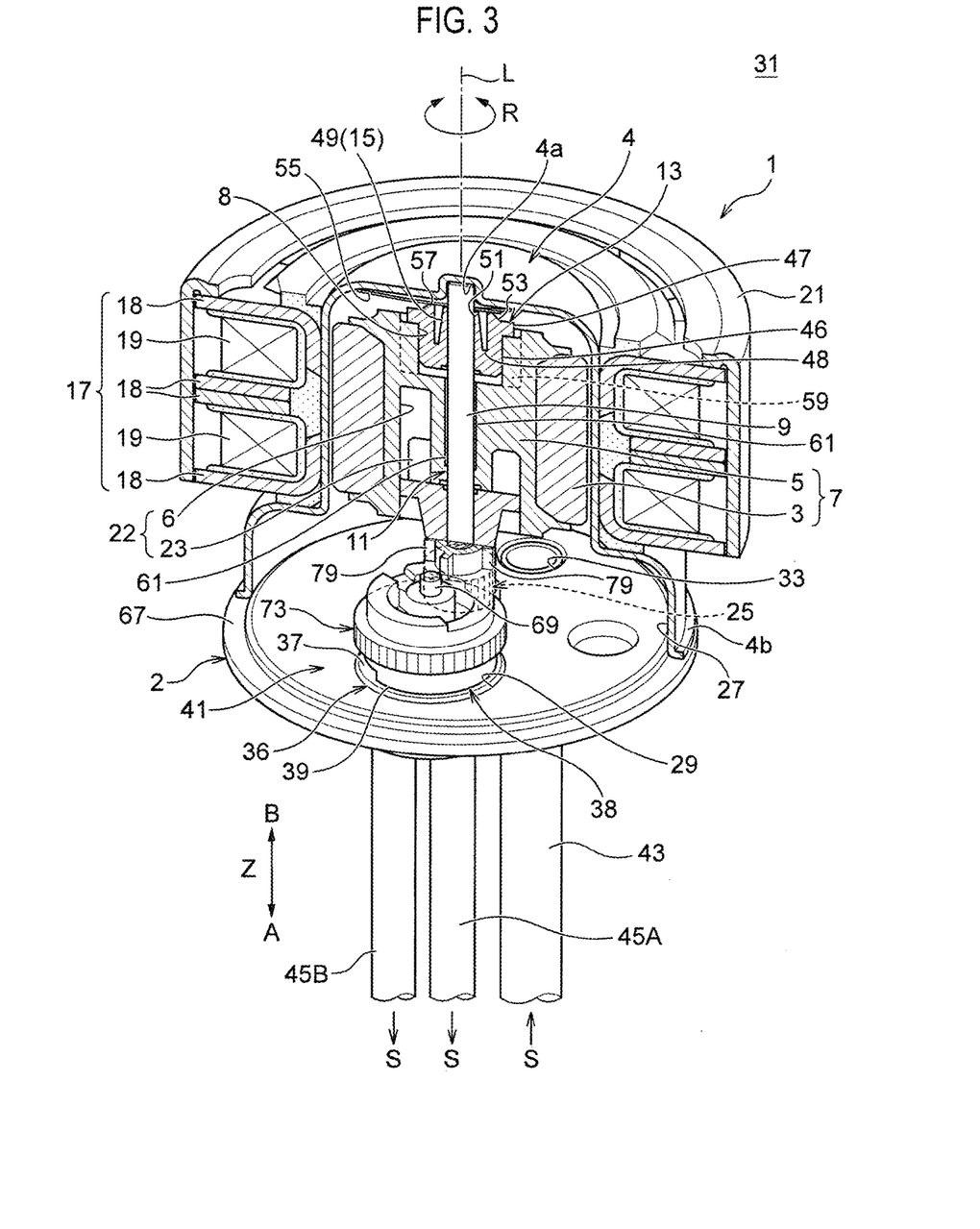
FIG. 3 is a view illustrating at least an embodiment of the present invention or a perspective view illustrating a partially cut valve drive device.
Figure 4:
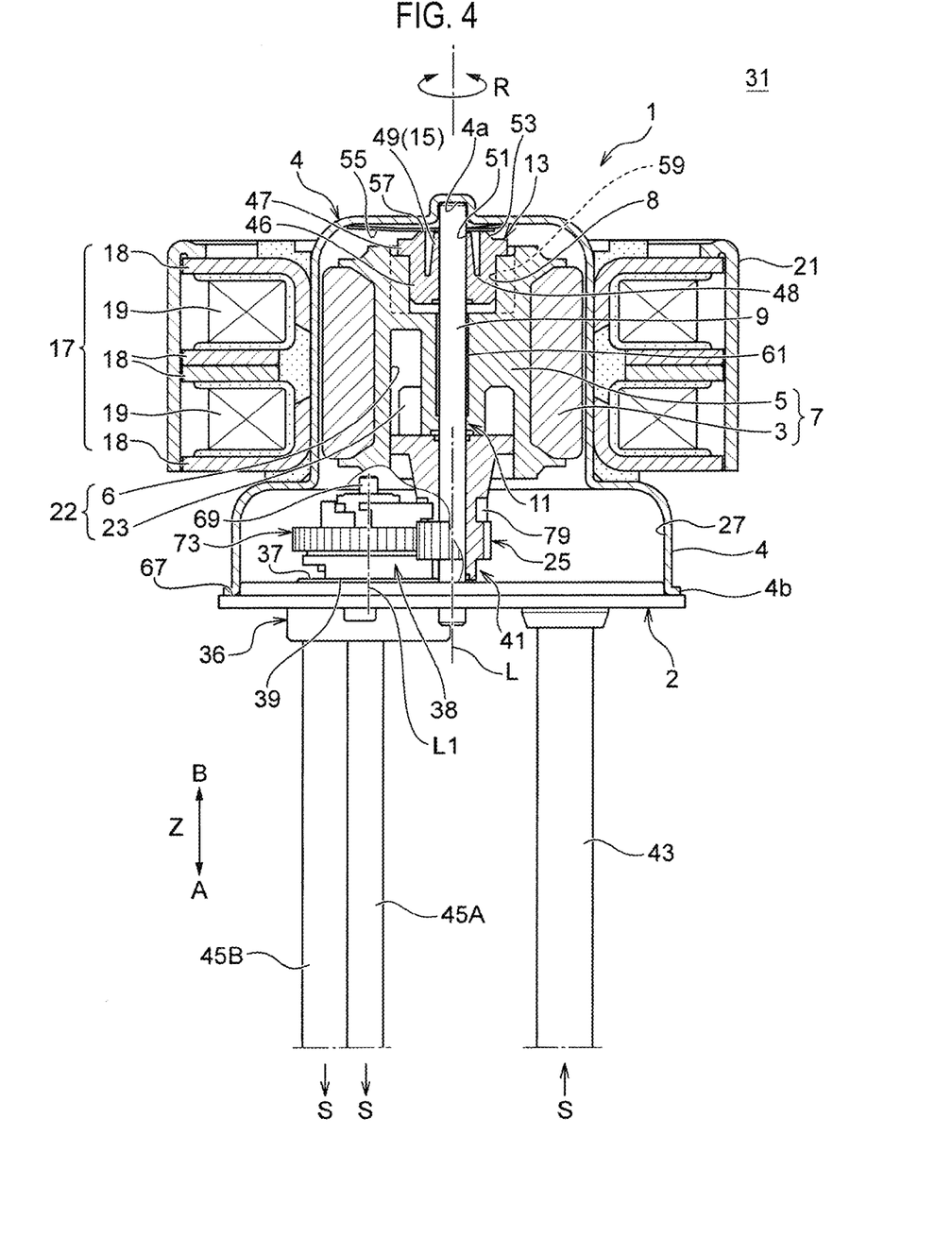
FIG. 4 is a view illustrating at least an embodiment of the present invention or a lateral sectional view illustrating a motor and the valve drive device.

Further, in the present embodiment, the pinion 25 is provided with an engagement claw 23 configured to be engaged with the engagement concave unit 6 provided in the rotor main body 5, at the upper position in FIG. 3 and FIG. 4. The pinion 25 is configured to rotate integrally with the rotor 7 around the spindle 9 by an engagement structure 22 including the engagement concave unit 6 and the engagement claw 23.

As illustrated in FIG. 3 and FIG. 4, the pinion 25 is located below the rotor 7 and outputs a rotational motion generated by the motor 1 to outside.

(2) Brief Configuration of Valve Drive Device (see FIG. 1 to FIG. 4)

A valve drive device 31 according to the present embodiment includes the base 2 including a fluid inlet 33, and a valve seat 36 having a fluid outlet 35 and a valve seat surface 37, at least one of the fluid inlet 33 and the fluid outlet 35 being opened at the valve seat surface 37, the cover 4 configured to define, between the valve seat surface 37 and the cover 4, a valve chamber 27 with which the fluid inlet 33 and the fluid outlet 35 communicate, and a contact surface 39 being rotatably arranged in the valve chamber 27 and sliding with the valve seat surface 37. Further, a valve element 38 configured to switch a flow path of a fluid S by rotation, and a valve element drive mechanism 41 configured to rotate the valve element 38 about an axis L1 (FIG. 4, FIG. 7, and FIG. 8) orthogonal to the valve seat surface 37 are provided.

The valve element drive mechanism 41 uses the embodiment-based motor 1, as a power source, including the above-described rotor 7, spindle 9, first bearing unit 11, and second bearing unit 13.

Further, in the present embodiment, the spindle 9 of the motor 1 is raised from a center of the base 2, and the fluid inlet 33 and an opening 29 configured to attach the valve seat 36 are formed in an outer region of the spindle 9.

The valve seat 36 attached to the opening 29 is formed with two fluid outlets 35, that is, a first fluid outlet 35A and a second fluid outlet 35B. As illustrated in FIG. 3 and FIG. 4, the fluid inlet 33, the first fluid outlet 35A, and the second fluid outlet 35B are connected with one inflow pipe 43 and two outflow pipes 45A, 45B extending downward respectively.

Figure 5:
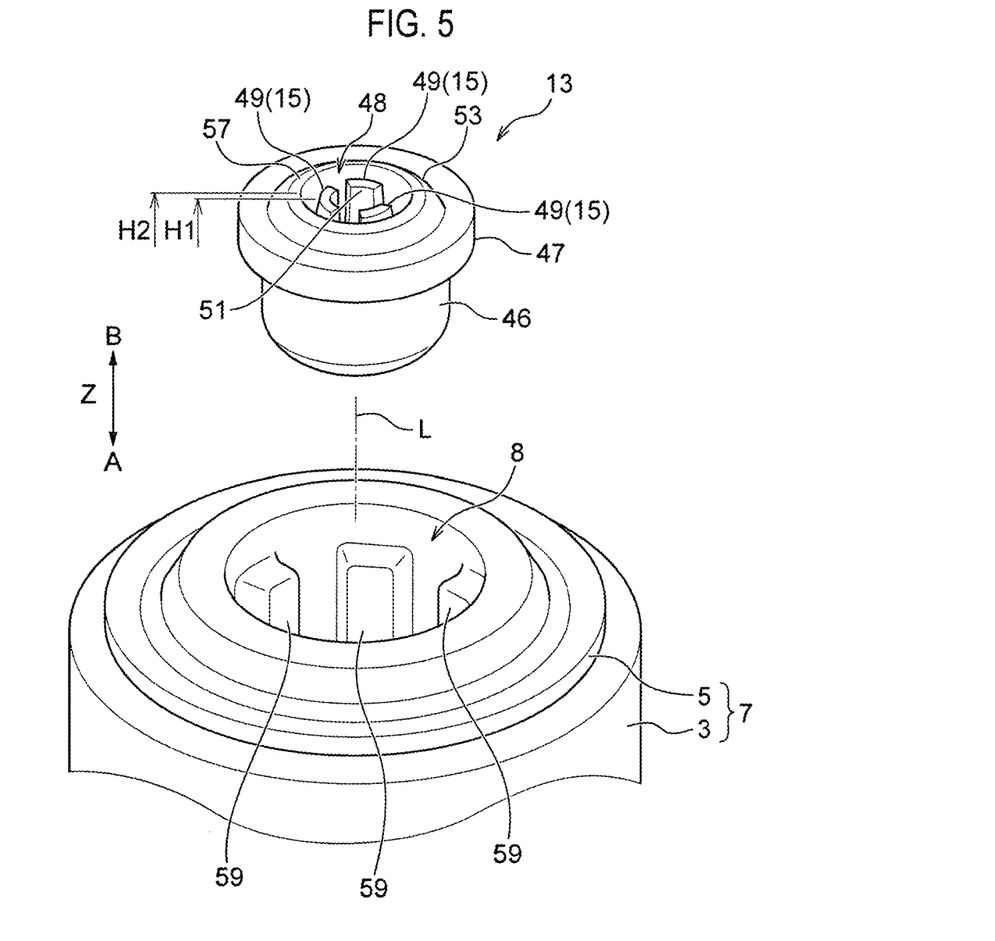
FIG. 5 is a view illustrating at least an embodiment of the present invention or a perspective view illustrating a second bearing unit.
Figure 6:
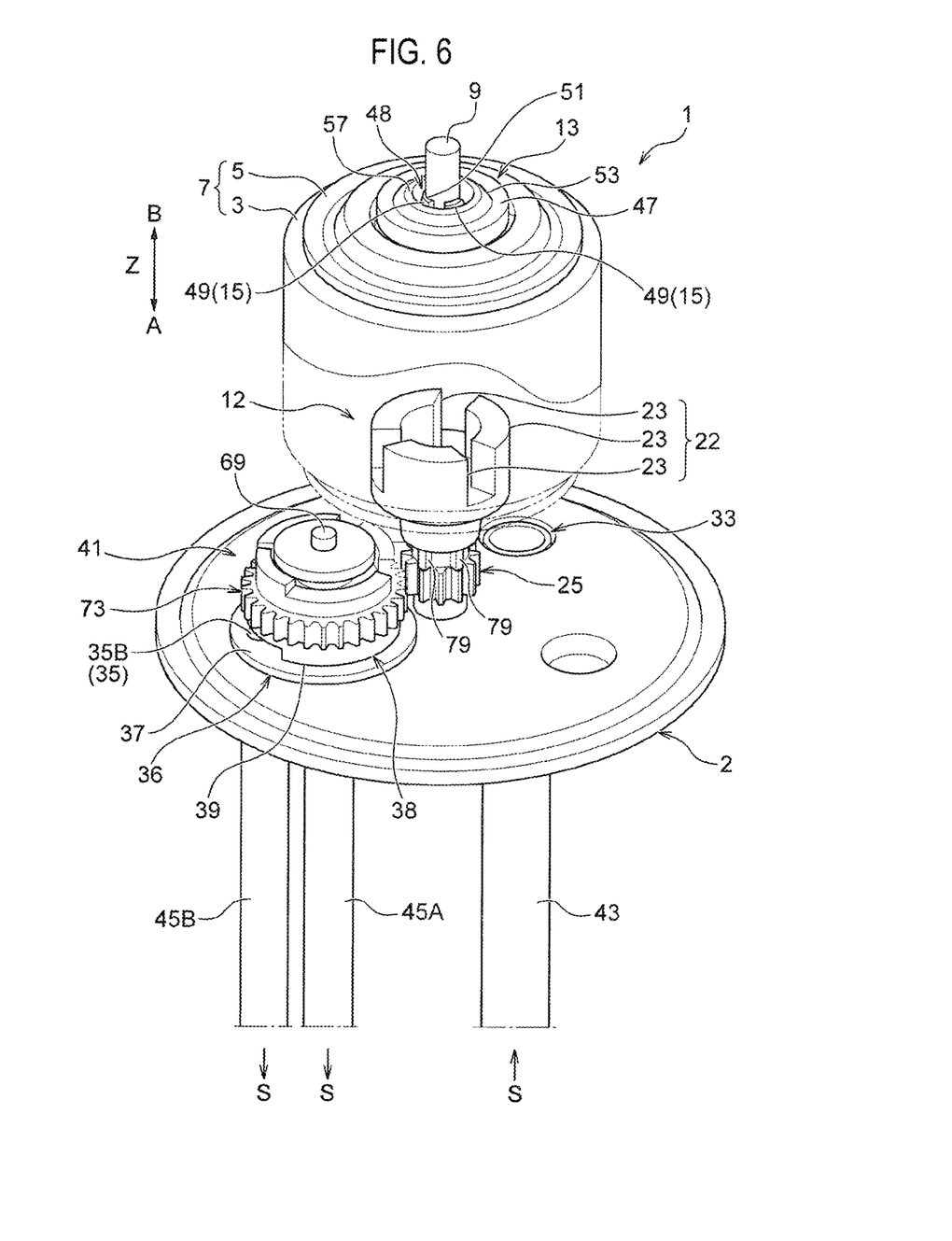
FIG. 6 is a view illustrating at least an embodiment of the present invention or a perspective view in which a part of a rotor is indicated by an imaginary line and an internal member is indicated by a solid line in a state where a cover representing the valve drive device is removed.

(3) Specific Configuration of Motor (see FIG. 3 to FIG. 5)

In the present embodiment, the motor 1 is configured by a stepping motor as an example. The second bearing unit 13 of the motor 1 includes a cylinder-like main body 46, as an example, formed with a flange unit 47 protruding in a horizontal direction, and the elastic bearing unit 15, at an upper part thereof as illustrated. In the elastic bearing unit 15, a concave unit 48 with a predetermined depth is formed at a center of the main body 46. Then, as an example, three elastic arm units 49 are arranged to extend from a bottom surface of the concave unit 48, in the longitudinal direction Z of the spindle 9 and in a direction away from the first bearing unit 11 (at the upper part of FIG. 3, FIG. 4), to configure the elastic bearing unit 15.

The elastic arm units 49 are each formed of a plate material curved in an arc shape around the axis L of the spindle 9, and a width dimension and a thickness of the plate material are sized, as an example, to be slightly large at a base unit side connected to the bottom surface of the concave unit 48 and to be slightly small at a contact unit 51 at an arm distal end side slidably contacting the spindle 9.

Further, before the spindle 9 is inserted, a diameter of an inner surface of the contact unit 51 at a distal end of the three elastic arm units 49 is formed slightly smaller than an outer diameter of the spindle 9. As a result, in this configuration, if the spindle 9 is inserted into an interior surrounded by the three elastic arm units 49, the contact unit 51 contacts the outer diameter of the spindle 9, and thus, the three elastic arm units 49 are bent and deformed outward according to the outer diameter, and by a reaction force of the bending deformation, the contact unit 51 is pressed against the spindle 9.

Further, the three elastic arm units 49 are positioned at equal intervals in a circumferential direction of the spindle 9, and in the present embodiment, the three elastic arm units 49 are provided in the circumferential direction at three locations with intervals of 120°.

Further, on a top surface of the flange unit 47 of the main body 46, an enclosure unit 53 is provided which is raised upward along a circumferential surface of the concave unit 48 and is configured to enclose the three elastic arm units 49 from outside.

Then, in the present embodiment, a height H1 of an arm distal end position of each of the elastic arm units 49 is formed to be lower than a height H2 of the enclosure unit 53, when a direction of extension of the elastic arm unit 49 is defined as a height direction.

Further, in the present embodiment, as illustrated in FIG. 3 and FIG. 4, an elastic member 55 configured by a spring washer like a plate spring, as an example, between the second bearing unit 13 and an inner surface of a top plate of the cover 4, is arranged in a contracting manner.

Then, as illustrated in FIG. 5, the top surface of the enclosure unit 53 of the second bearing unit 13 acts as a receiving unit 57 against which the elastic member 55 abuts. In this configuration, the receiving unit 57 receives an urging force toward the one end A side provided in the elastic member 55, and thereby prevents the second bearing unit 13 from falling and moving upward.

Further, a radius of curvature of the inner surface of the contact unit 51 at a distal end of the three elastic arm units 49 is set to be substantially the same as a radius of curvature of the outer diameter of the spindle 9 in contact. As a result, the elastic bearing unit 15 is configured to be in surface contact with the spindle 9.

Further, in the present embodiment, configuration is that the second bearing unit 13 is formed of a different member from the rotor main body 5, and integrally rotates when engaged with the rotor main body 5. That is, in this configuration, when the main body 46 of the second bearing unit 13 is inserted into the concave unit 8 formed in the rotor main body 5 for mutual engagement, the second bearing unit 13 is rotated integrally with the rotor main body 5.

Further, in the present embodiment, as illustrated in FIG. 5, on an inner circumferential surface of the concave unit 8 of the rotor main body 5, a plurality of convex units 59 configured to press-contact the outer circumferential surface of the main body 46 of the second bearing unit 13 to be engaged to hold the second bearing unit 13 to position the second bearing unit 13 relative to the rotor main body 5 (bring the second bearing unit 13 into a fixed state), are provided with intervals in the circumferential direction.

Further, in the present embodiment, in a portion facing the outer circumferential surface of the spindle 9 of the rotor main body 5, that is, a region between the first bearing unit 11 and the second bearing unit 13, a relief 61 with its inner diameter being formed to be larger than the inner diameter of the first bearing unit 11 and the second bearing unit 13 to not contact the spindle 9, is formed.

According to the embodiment-based motor 1 thus configured, when the number of components is reduced by reducing the conventionally provided three bearing units to two, the motor 1 having a simple structure can be provided.

Further, a swing width of the vibration of the rotor 7 and the spindle 9 generated at the time of the operation of the motor 1 tends to be larger at the other end B side of the spindle 9 receiving no mechanical restraint force than the one end A side of the spindle 9 fixed to the base 2. In the present embodiment, at the other end B side of the spindle 9, the second bearing unit 13 is arranged which includes the elastic bearing unit 15 configured to reduce the swing width of the vibration at the other end B side of the spindle 9 by an action of the elastic arm unit 49. The elastic bearing unit 15 of the second bearing unit 13 reduces the clearance between the first bearing unit 11 and the spindle 9 and also the vibration generated between the rotor 7 and the spindle 9 generated due to variation in the clearance, and alleviates the generation of noise generated due to the vibration.

(4) Specific Configuration of Valve Drive Device (see FIG. 1 to FIG. 4 and FIG. 6 to FIG. 9)

Figure 1:
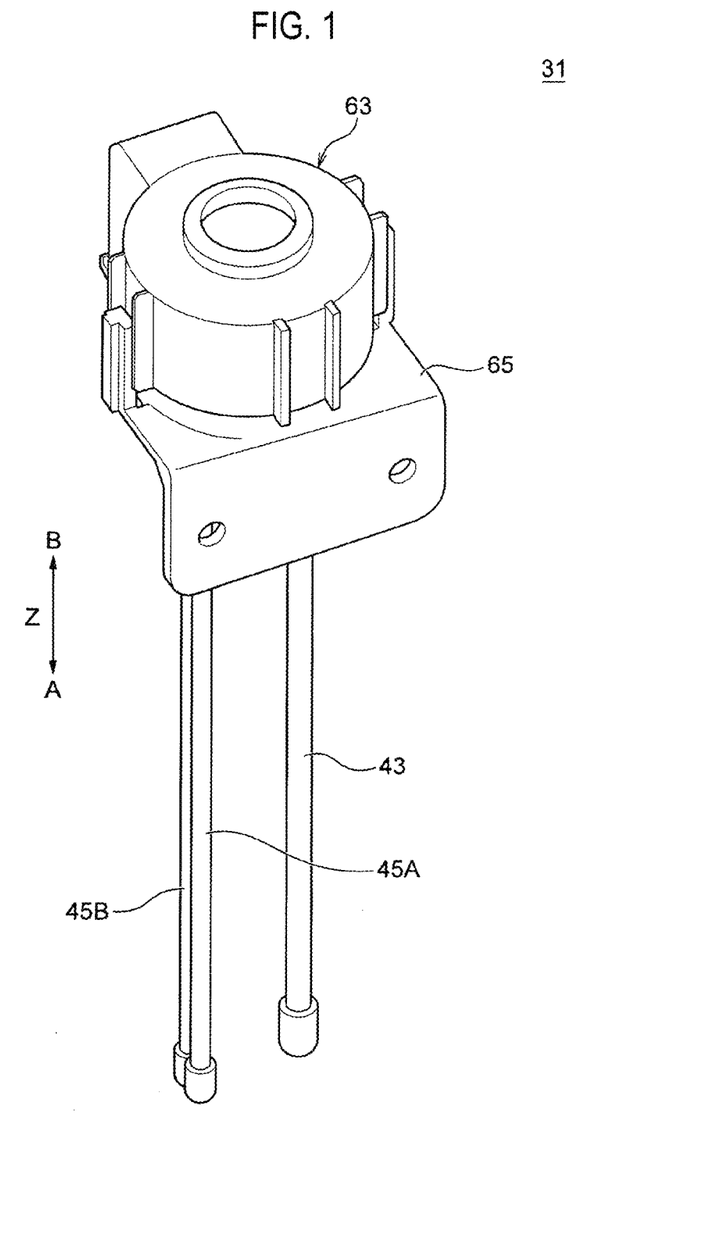
FIG. 1 is a view illustrating at least an embodiment of the present invention or a perspective view illustrating an appearance of a valve drive device.
Figure 2:
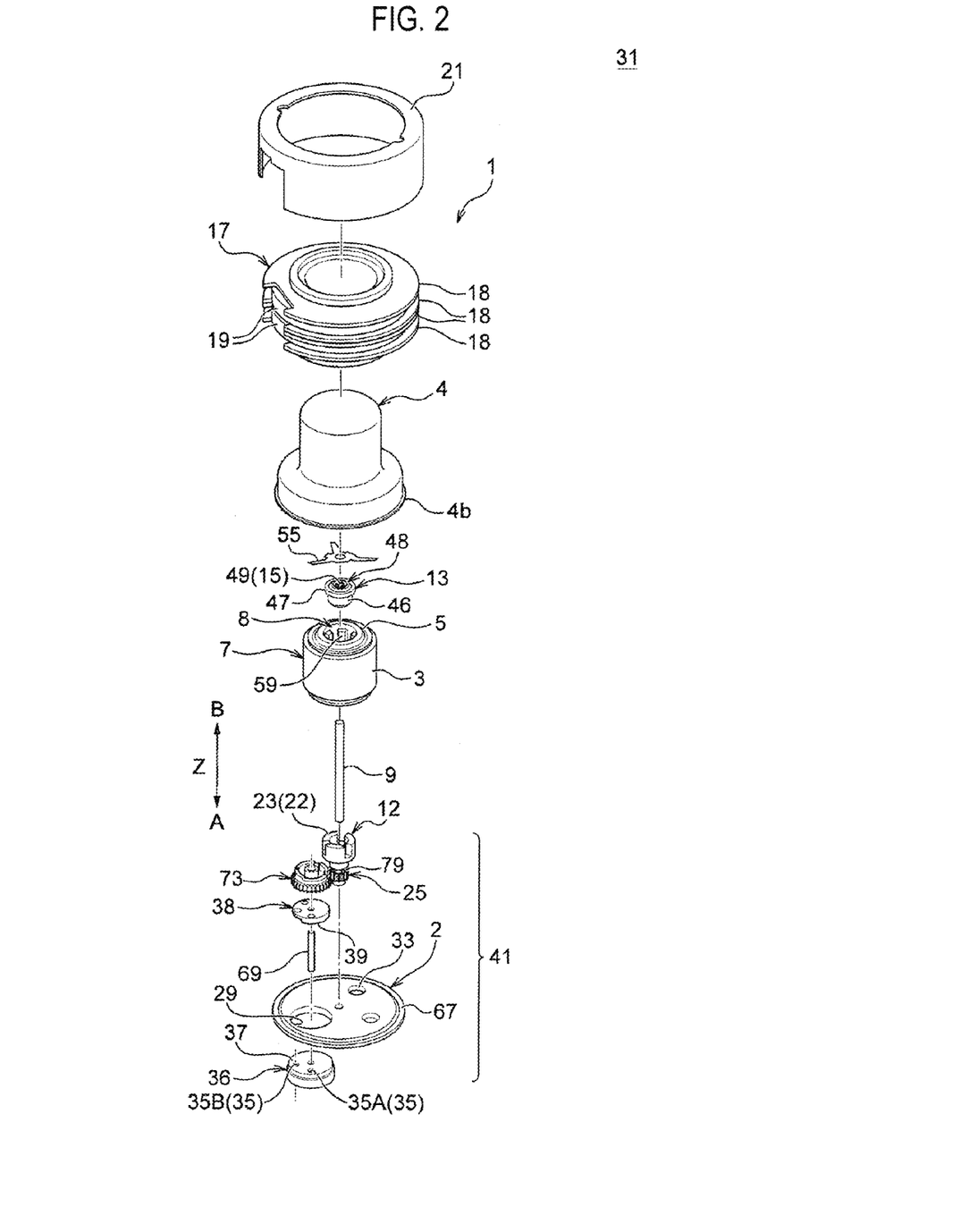
FIG. 2 is a view illustrating at least an embodiment of the present invention or an exploded perspective view illustrating an internal structure of the valve drive device.

The valve drive device 31 according to the present embodiment is used, for example, to adjust a supply amount of refrigerant (fluid) S for cooling the inside of a refrigerator. As illustrated in FIG. 1, the valve drive device 31 includes: a valve main body 63 configured to accommodate the motor 1, the base 2, the cover 4, the valve seat 36, the valve element 38, and the valve element drive mechanism 41; the single inflow pipe 43 extending in parallel from the valve main body 63; and the two outflow pipes 45A, 45B.

Further, the valve main body 63 includes an unillustrated connector configured to secure electrical connection with a control device provided outside, and a mounting plate 65 configured to mount the valve drive device 31 into the refrigerator or the like.

Inside the valve main body 63, as described above, the base 2 in a disc-like shape, as an example, and the cover 4 made of a nonmagnetic material (for example, made of stainless steel), as an example, in a stepped cup shape with a larger diameter at its lower part and a smaller diameter at its upper part, and configured to cover the base 2, are arranged. Further, an internal space sealed by the base 2 and the cover 4 is the valve chamber 27. Further, the opening 29 is formed in the base 2, and the valve seat 36 is attached by using the opening 29.

In addition, in this configuration, an annular stepped unit 67 is formed on an outer peripheral edge of the base 2, and a flange unit 4b formed on an opened bottom outer peripheral edge of the cover 4 is engaged with and attached to the stepped unit 67.

The valve seat 36 is, for example, a stepped cylindrical member having a small diameter at its upper part and a large diameter at its lower part, and the valve seat 36 is formed with the two fluid outlets 35A, 35B penetrating in the longitudinal direction Z of the spindle 9.

Further, a flat top surface of the valve seat 36 is the valve seat surface 37, and the two outflow pipes 45A, 45B are attached to the fluid outlets 35A, 35B, respectively, from below.

Further, at a center of the valve seat 36, a mounting shaft 69 extending in parallel to the longitudinal direction Z of the spindle 9 intersecting the valve seat surface 37, is raised. An upper end of the mounting shaft 69 is supported, as an example, by a support plate (not illustrated) arranged in the valve chamber 27. It is noted that the axis L1 of the mounting shaft 69 is provided parallel to the axis L of the spindle 9 at a position closer to an outer periphery of the base 2 offset by a fixed distance.

The disc-shaped valve element 38 is rotatably mounted to the mounting shaft 69. The valve element 38 is rotatably placed on the valve seat surface 37 around the axis L1 of the mounting shaft 69.

Figure 8:
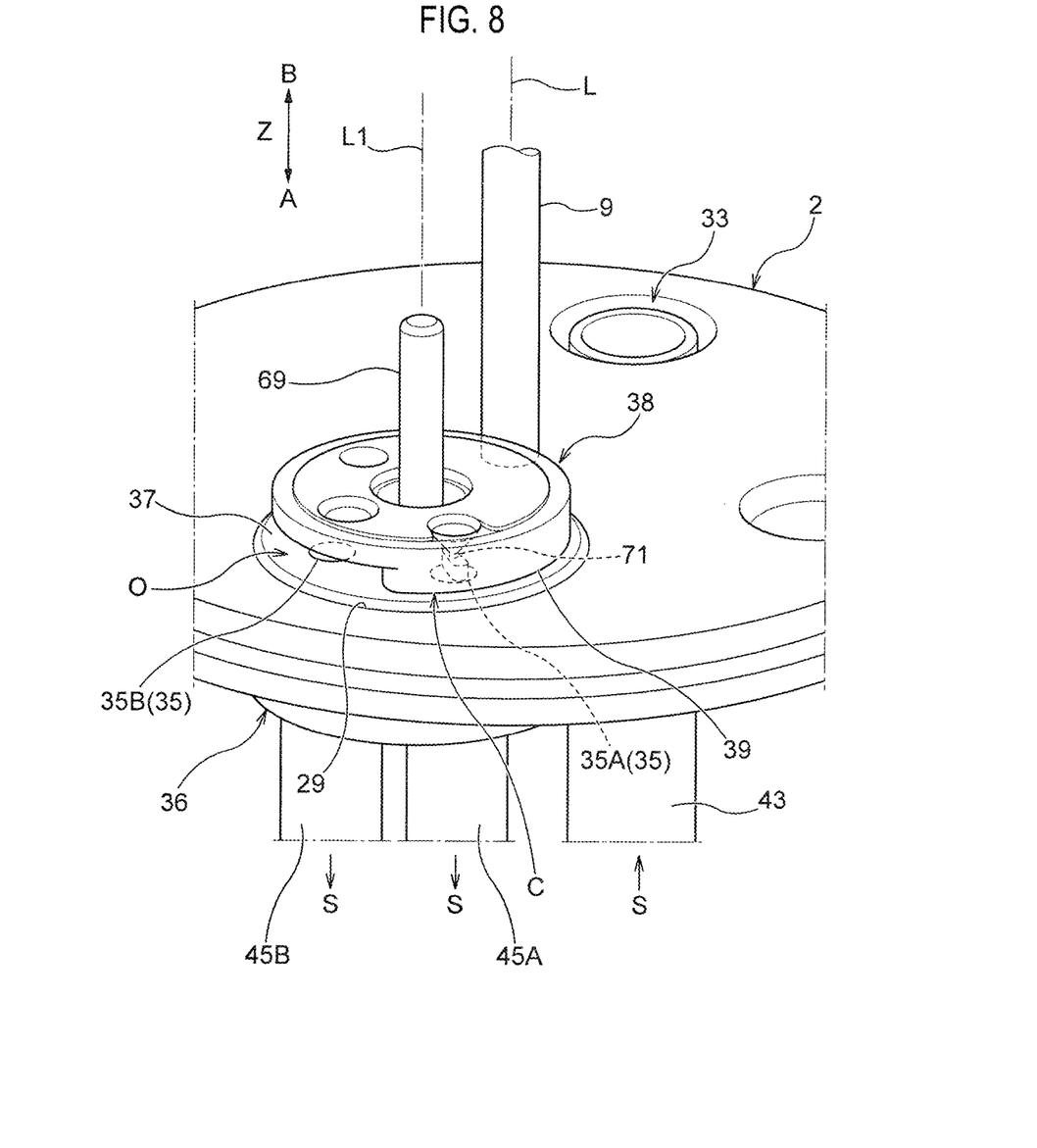
FIG. 8 is a view illustrating at least an embodiment of the present invention or a perspective view illustrating a positional relationship between a base and a valve element.
Figure 9:
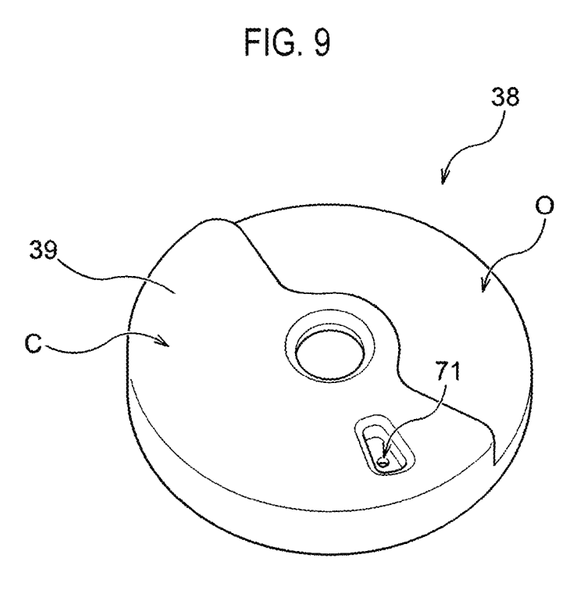
FIG. 9 is a view illustrating at least an embodiment of the present invention or a perspective view illustrating a valve element from a bottom surface side.

As illustrated in FIG. 8 and FIG. 9, a top surface of the valve element 38 is a connection unit and a back surface thereof is a contact surface, and thus, both differ in shape. Specifically, in the present embodiment, the top surface side is formed in a circular shape, and the back surface side is formed in a fan shape obtained by cutting a part (for example, in a range of about 160°) of the circular shape.

Further, a fan-shaped bottom surface of the valve element 38 is the contact surface 39 contacting the valve seat surface 37, and the fan-shaped portion is a closed region C of the valve element 38 and the remaining cut portion is an opened region O. In addition, in the closed region C of the valve element 38, a throttle hole 71 configured to finely adjust a flow rate of the refrigerant S is formed.

The valve element drive mechanism 41 uses the motor 1 as a drive source, and is configured, as an example, to include a pinion 25 provided to rotate integrally with the rotor main body 5, a reduction gear 73 configured to mesh with the pinion 25, and further, the valve element 38, at the one end A side of the spindle 9 of the motor 1.

It is noted that the reduction gear 73 has a larger diameter and is formed with a larger number of teeth than those of the pinion 25, and with this configuration, the reduction gear 73 and the pinion 25 constitute the reduction mechanism.

Figure 7:
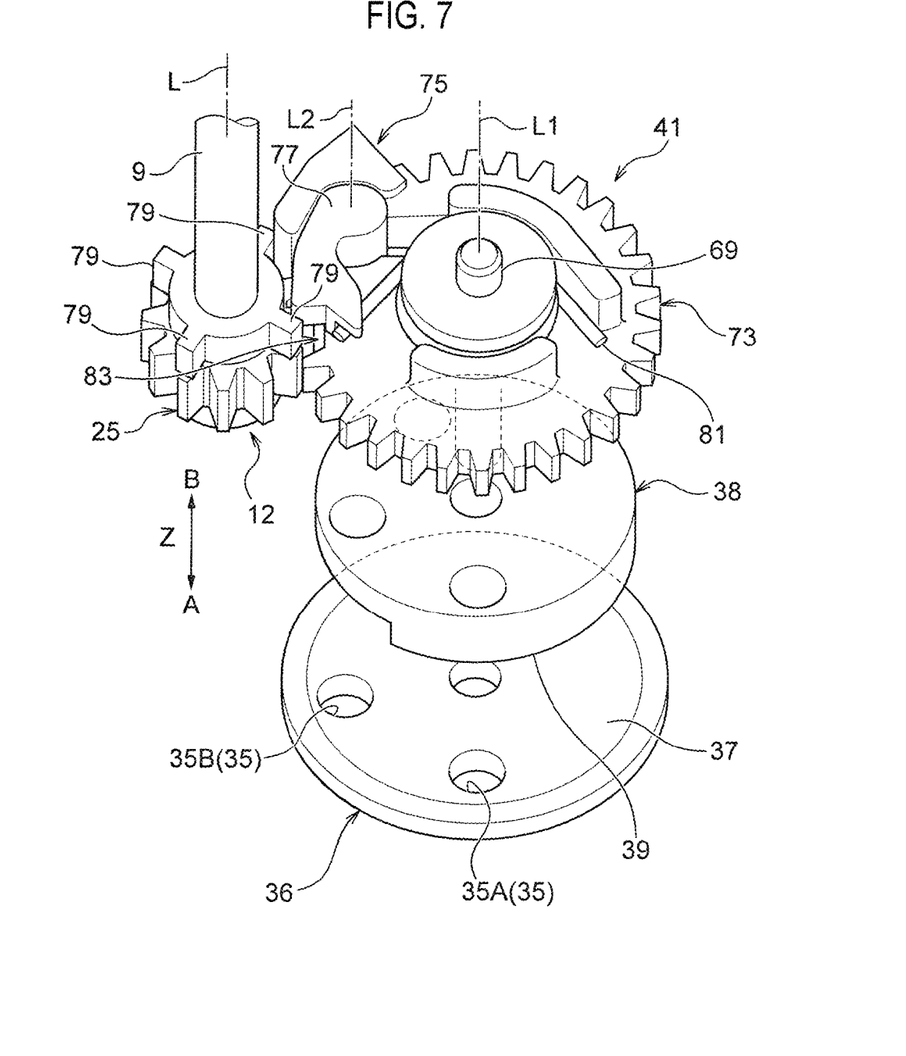
FIG. 7 is a view illustrating at least an embodiment of the present invention or an exploded perspective view illustrating a valve element drive mechanism.

Further, as illustrated in FIG. 7, in the present embodiment, a rotor step-out suppression mechanism 75 is provided as a mechanism for reducing an impact noise generated when the valve element 38 returns to the origin. The rotor step-out suppression mechanism 75 is configured to include, as an example, a lever 77 provided in the reduction gear 73 and configured to pivot around a pivot axis L2, four convex units 79, as an example, extending in parallel to the longitudinal direction Z of the spindle 9 above the pinion 25, and an urging spring 81 including a torsion coil spring, as an example, configured to urge to unceasingly press-contact the lever 77 toward a pinion 25 side.

Further, in this configuration, a toothless unit 83 is formed in the reduction gear 73 at a site attached with the lever 77, and when the toothless unit 83 and the pinion 25 face each other, the pinion 25 rotates idly and the rotation is not transmitted to the reduction gear 73. That is, even if the pinion continues to rotate integrally with the rotor 7, this rotation is idled due to the presence of the toothless unit 83 and is not transmitted to the reduction gear 73. At the time of this idle rotation, the convex unit 79 located above the pinion 25 pushes the lever 77 against a spring force of the urging spring 81 to retreat the lever 77, and as a result, the rotation of the pinion 25 is continued without stepping out.

To perform an opening/closing operation of the valve element 38, when the pinion is rotated in a direction (forward rotation direction) opposite to the aforementioned direction, firstly, the convex unit 79 abuts against an abutted unit of the lever 77, the lever 77 is pushed, and as a result, the reduction gear 73 starts to rotate, the pinion 25 is in a positional relationship to face a gear portion other than the toothless unit 83 of the reduction gear 73 to be in mesh with each other, and thereafter, the power is transmitted from the pinion 25 to rotate the reduction gear 73. As a result, the opening/closing operation of the valve element 38 is performed.

Further, at a bottom surface side of the reduction gear 73 and at a top surface side of the valve element 38, an unillustrated concave-convex engagement structure configured to integrally engaging the reduction gear 73 and the valve element 38 is provided.

Figure 10:
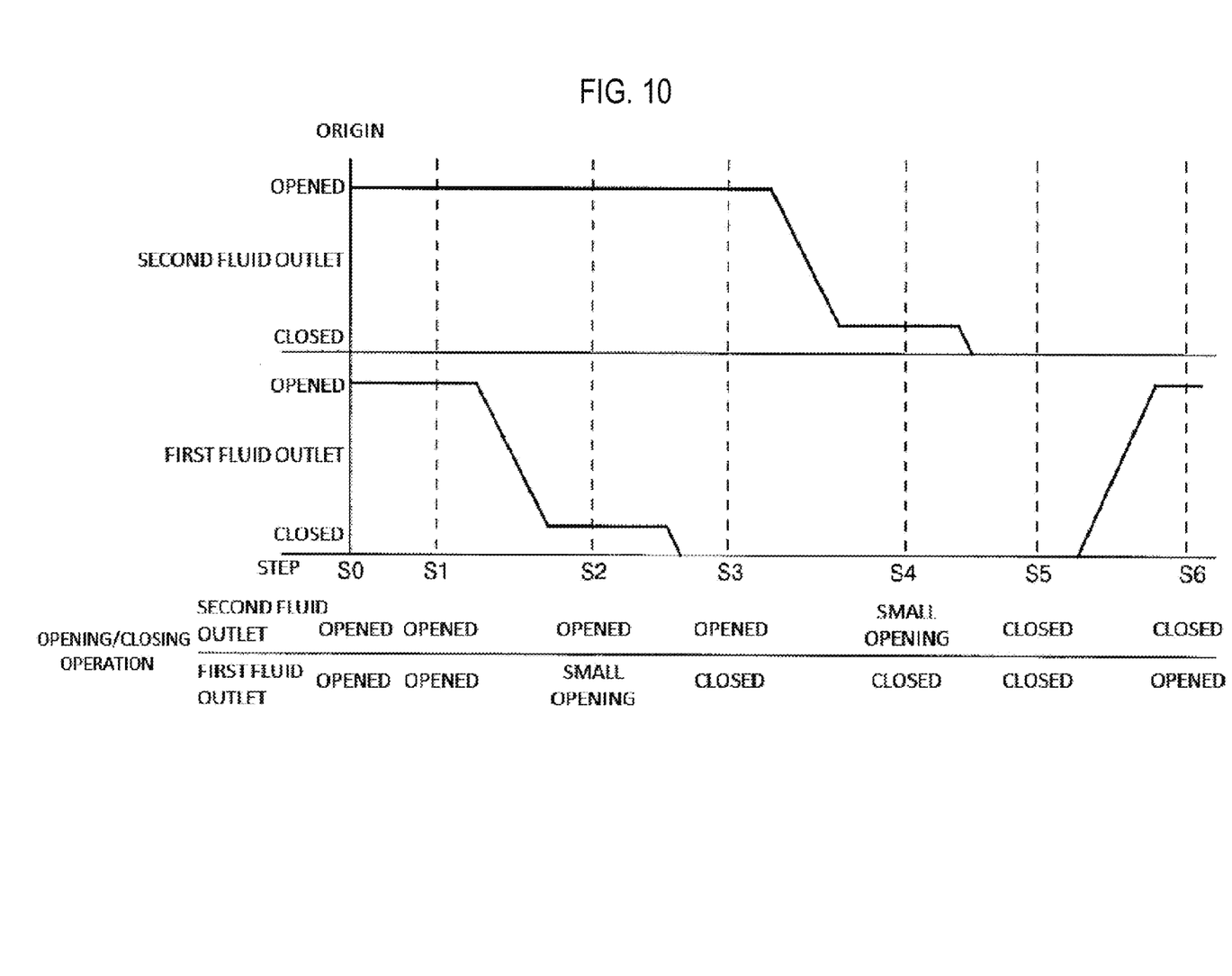
FIG. 10 is a graph of at least an embodiment of the present invention or a graph illustrating a relationship between a rotation angle (number of steps) of the valve element and an opening/closing operation of the valve element.
Figure 11:
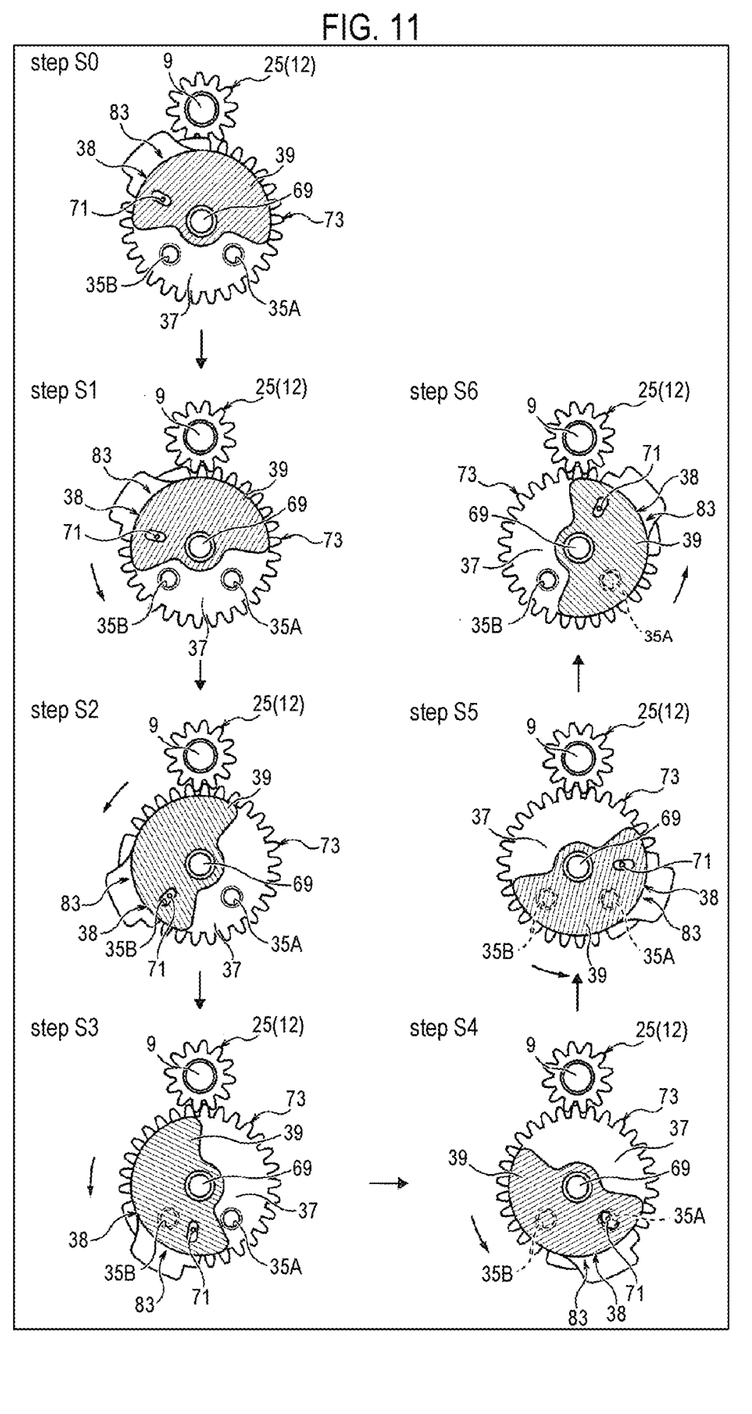
FIG. 11 is a view illustrating at least an embodiment of the present invention where each plan sectional view illustrates a positional relationship between a valve element and a valve seat surface formed when the valve element is rotated in each step in FIG. 10 from an origin position.

(5) Operation Mode of Valve Drive Device (see FIG. 10, FIG. 11)

Next, an operation mode of the embodiment-based valve drive device configured as described above will be described with a focus on a relationship between a rotation angle (number of steps) of the valve element 38 and the opening/closing operation of the valve element 38.

When a power is supplied to the motor 1 serving as a drive source of the valve drive device 31 and a current in a predetermined direction is passed to the coil 19, the rotor 7 starts to rotate in a forward rotation direction. The rotation of the rotor 7 is transmitted to the pinion 25 located below the first bearing unit 11 via the rotor main body 5.

The rotation of the pinion 25 is transmitted to the reduction gear 73 meshing with the pinion 25 in a decelerated state, and is transmitted to the valve element 38 rotating integrally with the reduction gear 73.

The relationship between the rotation angle (number of steps) of the valve element 38 and the opening/closing operation of the valve element 38 is as shown in FIG. 10. First, in a state where the valve element 38 is located at an origin position, the positional relationship between the valve element 38 and the valve seat surface 37 is as illustrated in FIG. 11, the first fluid outlet 35A and the second fluid outlet 35B of the valve seat surface 37 are both in an opened state.

Therefore, the refrigerant S flowing into the valve chamber 27 from the fluid inlet 33 through the inflow pipe 43 passes through the two fluid outlets 35A, 35B and the two outflow pipes 45A, 45B, and a predetermined flow rate is supplied to a cooling duct of the refrigerator.

It is noted that this state is continued even at a position where the valve element 38 illustrated in FIG. 11 is rotated from the origin position (step S0) in a forward rotation direction of step S1.

At the position where the valve element 38 is rotated in a forward rotation direction of step S2 from the origin position illustrated in FIG. 11, the first fluid outlet 35A is still in the opened state; however, a majority of the second fluid outlet 35B is blocked by the contact surface 39 of the valve element 38.

However, at this position, the throttle hole 71 formed in the valve element 38 communicates with the second fluid outlet 35B, and thus, a restricted flow rate of the refrigerant S flowing through the throttle hole 71 flows into the second fluid outlet 35B.

Further, when the valve element 38 rotates in the forward rotation direction to arrive at a rotational position of step S3 from the origin position illustrated in FIG. 11, the positions of the throttle hole 71 and the second fluid outlet 35B are shifted, and thus, the first fluid outlet 35A is in the opened state, and the second fluid outlet 35B is in the closed state.

Further, when the valve element 38 rotates in the forward rotation direction to arrive at a rotational position of step S4 from the origin position illustrated in FIG. 11, in turn, the positions of the throttle hole 71 and the first fluid outlet 35A coincide with each other, the restricted flow rate of the refrigerant S flowing through the throttle hole 71 flows into the first fluid outlet 35A. It is noted that the second fluid outlet 35B is still in the closed state.

Further, when the valve element 38 rotates in the forward rotation direction to arrive at a rotational position of step S5 from the origin position illustrated in FIG. 11, the positions of the throttle hole 71 and the first fluid outlet 35A are shifted, and thus, the first fluid outlet 35A and the second fluid outlet 35B are both in the closed state.

Then, when the valve element 38 rotates in the forward rotation direction to arrive at a rotational position of step S6 from the origin position illustrated in FIG. 11, the second fluid outlet 35B blocked by the contact surface 39 of the valve element 38 is in an opened state, and the first fluid outlet 35A continues to be in the closed state. As a result, a series of opening/closing operation by the valve element 38 are completed.

When the valve element 38 reaches a rotational position of step S6 in the forward rotation direction from the origin position illustrated in FIG. 11, the rotation direction of the motor 1 is reversed, and the valve element 38 is rotated in a reverse rotation direction. Then, when the valve element 38 returns to the origin position illustrated in FIG. 11, and further, the valve element 38 is rotated in the reverse rotation direction, the pinion 25 faces the toothless unit 83 of the reduction gear 73 and the meshing of both is released, and as a result, the rotor step-out suppression mechanism 75 is actuated to reduce the impact generated when the valve element 38 returns to the origin position to suppress the generation of noise.

Next, when the motor 1 is rotated in the forward rotation direction, the power is transmitted to the reduction gear 73 to be rotated via the rotor step-out suppression mechanism 75 to restore a state where the pinion 25 and the reduction gear 73 mesh with each other in FIG. 11.

According to the embodiment-based valve drive device 31 thus configured, it is possible to provide the valve drive device 31 including the motor 1 having a simple structure and generating a small vibration at the time of operation.

Further, the vibration of the motor 1 is also transmitted to the valve element drive mechanism 41 via the second bearing unit 13, the rotor 7, the first bearing unit 11, and the pinion 25, but a smooth and low-noise valve operation of the valve element 38 is executed by the motor 1 generating a small vibration.

OTHER EMBODIMENTS

The motor 1 and the valve drive device 31 according to at least an embodiment of the present invention are basically configured as described above, but it is of course possible to modify, omit, etc., a partial configuration within the scope of the invention of the present application.

For example, the number of elastic arm units 49 is three in the above embodiment, but may be two or four or more. In addition, the elastic bearing unit 15 may be configured of another component (for example, elastically deformable synthetic rubber and urethane rubber) other than the elastic arm unit 49.

Moreover, although the second bearing unit 13 and the rotor main body 5 are configured of different members in the embodiment, the second bearing unit 13 and the rotor main body 5 can be formed by integral molding.

Moreover, in the embodiment, the first bearing unit 11 and the second bearing unit 13 are applied to the cantilever type spindle 9, but the first bearing unit 11 and the second bearing unit 13 can also be applied to the spindle 9 having a both end support mechanism.

In the above embodiment, the configuration where the fluid outlet 35 is provided for the valve seat surface 37 is adopted; however, a configuration may be adopted where the fluid inlet 33 is provided for the valve seat surface 37 and the fluid outlet 35 is provided in other parts of the base 2.

Further, in the above embodiment, although a configuration of a deceleration system in which the output of the motor 1 is reduced by using the pinion 25 and the reduction gear 73 as the valve element drive mechanism 41 and transmitted to the valve element 38 is adopted; however, it is also possible to omit the pinion 25 and the reduction gear 73 and adopt a direct-acting valve element drive mechanism 41 configured to directly transmit the rotation of the rotor 7 to the valve element 38.

What is claimed is:

1. A motor comprising:
a rotor including a magnet fixed to an outer periphery of a rotor main body;
a spindle configured to rotatably support the rotor via the rotor main body;
a first bearing unit provided at one end side of the rotor in a longitudinal direction of the spindle, and configured to slidably contact the spindle; and
a second bearing unit provided at the other end side of the rotor in the longitudinal direction of the spindle, and configured to slidably contact the spindle,
wherein the first bearing unit slidably contacts the spindle with a set clearance,
wherein the second bearing unit includes an elastic bearing unit configured to slidably contact the spindle in a state of being elastically pressed against the spindle, is formed separately from the rotor main body, and is configured to be engaged with the rotor main body to rotate integrally with the rotor main body,
wherein when the first bearing unit is defined as a bearing unit at the one end side in the longitudinal direction of the spindle, the elastic bearing unit is located as a bearing unit at the other end side, and
wherein the rotor main body is provided with a plurality of convex units configured to hold the second bearing unit to be engaged with the rotor main body.

2. The motor according to claim 1,
wherein the elastic bearing unit includes a plurality of elastic arm units extending from a main body of the second bearing unit in a direction that is the longitudinal direction of the spindle and is a direction away from the first bearing unit, and
wherein the plurality of elastic arm units each include, at a distal end side thereof, a contact unit configured to slidably contact the spindle.

3. The motor according to claim 2, wherein when the spindle is inserted inside an area surrounded by the plurality of elastic arm units, the plurality of elastic arm units are bent and deformed along an outer diameter of the spindle and pressed against the spindle by a reaction of the bending deformation.

4. The motor according to claim 2, wherein the plurality of elastic arm units are positioned at equal intervals in a circumferential direction of the spindle.

5. The motor according to claim 2,
wherein the second bearing unit includes an enclosure unit configured to surround the plurality of elastic arm units, and
wherein an arm distal end position of each of the elastic arm units is lower than a height of the enclosure unit when the direction in which the plurality of elastic arm units are formed to extend is defined as a height direction.

6. The motor according to claim 2, wherein the second bearing unit includes, at the distal end side of the plurality of elastic arm units, a receiving unit configured to receive an urging force of an elastic member toward the one end side.

7. The motor according to claim 1, wherein the elastic bearing unit is in surface contact with the spindle.

8. The motor according to claim 1, wherein an outer peripheral surface of a main body of the second bearing unit is configured to contact the plurality of convex units to position the second bearing unit relative to the rotor main body and bring the second bearing unit into a fixed state.

9. The motor according to claim 1, wherein a relief without contacting the spindle is formed in a portion of the rotor main body facing the spindle, the portion being a region between the first bearing unit and the second bearing unit.

10. The motor according to claim 1, wherein one end of the spindle at a side of the first bearing unit is fixed non-rotatably to a base of the motor, and
wherein the other end thereof at a side of the second bearing unit is not fixed in a rotation direction.

11. A valve drive device, comprising:
a base including a fluid inlet, a fluid outlet, and a valve seat surface, at least one of the fluid inlet and the fluid outlet being opened at the valve seat surface;
a cover configured to define, between the valve seat surface and the cover, a valve chamber with which the fluid inlet and the fluid outlet communicate;
a valve element rotatably arranged in the valve chamber, having a contact surface sliding on the valve seat surface, and configured to rotate to switch a flow path of a fluid; and
a valve element drive mechanism configured to rotate the valve element about an axis orthogonal to the valve seat surface,
wherein the valve element drive mechanism rotates the valve element by using, as a power source, the motor according to claim 1.

12. The valve drive device according to claim 11, wherein one end of the spindle of the motor at a side of the first bearing unit is non-rotatably fixed to the base,
wherein the other end thereof at a side of the second bearing unit is not fixed in a rotation direction, and
wherein a pinion is arranged between the base and the rotor main body on a side of the one end of the spindle,
the pinion is attached at the side of the first bearing unit of the rotor main body so as to rotate integrally with the rotor, and
the valve element is configured to rotate via a reduction gear meshing with the pinion.

13. The valve drive device according to claim 12, wherein an elastic member configured to apply, to the rotor, an urging force in a direction toward the base is arranged at a side of the other end of the spindle in a state where the urging force acts on the second bearing unit.

* * * * *